United States Patent
Takahashi

(10) Patent No.: US 11,303,238 B2
(45) Date of Patent: Apr. 12, 2022

(54) MOTOR CONTROL DEVICE

(71) Applicant: ADVICS CO., LTD., Kariya (JP)

(72) Inventor: Atsushi Takahashi, Okazaki (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/272,544

(22) PCT Filed: Sep. 24, 2019

(86) PCT No.: PCT/JP2019/037233
§ 371 (c)(1),
(2) Date: Mar. 1, 2021

(87) PCT Pub. No.: WO2020/066995
PCT Pub. Date: Apr. 2, 2020

(65) Prior Publication Data
US 2021/0328534 A1    Oct. 21, 2021

(30) Foreign Application Priority Data
Sep. 26, 2018   (JP) .............................. JP2018-180126

(51) Int. Cl.
*H02K 21/02*   (2006.01)
*H02P 21/22*   (2016.01)

(52) U.S. Cl.
CPC .......... *H02P 21/22* (2016.02); *H02P 2207/05* (2013.01)

(58) Field of Classification Search
CPC ........ H02P 6/18; H02P 21/22; H02P 2207/05; H02K 21/029
See application file for complete search history.

(56) References Cited

U.S. PATENT DOCUMENTS

| | | | |
|---|---|---|---|
| 2008/0019855 A1* | 1/2008 | Atarashi | H02K 21/029 418/7 |
| 2011/0175560 A1* | 7/2011 | Akiyama | H02P 6/18 318/400.32 |
| 2019/0202422 A1 | 7/2019 | Kawamura et al. | |

FOREIGN PATENT DOCUMENTS

JP    2018052145 A    4/2018

OTHER PUBLICATIONS

International Search Report (PCT/ISA/210) dated Dec. 10, 2019, by the Japanese Patent Office as the International Searching Authority for International Application No. PCT/JP2019/037233.
Written Opinion (PCT/ISA/237) dated Dec. 10, 2019, by the Japanese Patent Office as the International Searching Authority for International Application No. PCT/JP2019/037233.

* cited by examiner

*Primary Examiner* — Cortez M Cook
(74) *Attorney, Agent, or Firm* — Buchanan Ingersoll & Rooney PC

(57) ABSTRACT

A motor control device includes a command current derivation unit that derives a command current vector based on a command torque for a brushless motor, a phase difference derivation unit that derives a phase difference between a direction of a real d-axis of rotating coordinates of vector control and a direction of an estimated d-axis thereof, a change unit that changes a direction of the command current vector derived by the command current derivation unit according to the phase difference, and a drive control unit that drives the brushless motor based on the command current vector whose direction is changed by the change unit.

8 Claims, 3 Drawing Sheets

MOTOR CONTROL DEVICE

TECHNICAL FIELD

The present disclosure relates to a motor control device that controls a brushless motor.

BACKGROUND ART

PTL 1 describes an example of a motor control device that drives a brushless motor by vector control. In this motor control device, a d-axis command current and a q-axis command current are derived based on an intersection of a current limit circle and a voltage limit circle in rotating coordinates of vector control, and an inverter is controlled based on the d-axis command current and the q-axis command current. In this way, the brushless motor can be driven.

Note that the current limit circle is determined from a current characteristic on a d-axis and a q-axis based on a permissible current of a switching element of the inverter. The voltage limit circle is determined from a current characteristic on the d-axis and the q-axis based on a power supply voltage, an angular velocity of the brushless motor, etc.

CITATION LIST

Patent Literature

PTL 1: JP-A-2018-52145

SUMMARY

Technical Problem

An axis estimated to be the d-axis of the rotating coordinates of the vector control is defined as an estimated d-axis, and an actual d-axis is defined as a real d-axis. When a rotor of the brushless motor is driven, a phase difference may occur between a direction of the real d-axis and a direction of the estimated d-axis. In a case where such a phase difference is large, in the rotating coordinates, a point indicating the d-axis command current and the q-axis command current derived as described above may be located outside a region surrounded by the voltage limit circle and the current limit circle. In this case, even when the brushless motor is controlled based on the d-axis command current and the q-axis command current, a d-axis current diverges from the d-axis command current or a q-axis current diverges from the q-axis command current. As a result, an output torque of the brushless motor diverges from a required torque, or a rotation velocity of the rotor diverges from a required value of the rotation velocity, so that controllability of the brushless motor deteriorates.

Solution to Problem

A motor control device for solving the above-mentioned problem is a device that drives a brushless motor based on a command current vector represented by a d-axis command current, which is a current command value in a direction of an estimated d-axis which is an axis estimated to be a d-axis of rotating coordinates of vector control, and a q-axis command current, which is a current command value in a direction of an estimated q-axis which is an axis estimated to be a q-axis of the rotating coordinates. The motor control device includes a command current calculation unit that calculates the command current vector based on a command torque which is a command value of a torque of the brushless motor, a phase difference calculation unit that calculates a phase difference between a direction of a real d-axis which is an actual d-axis of the rotating coordinates and the direction of the estimated d-axis, a change unit that changes a direction of the command current vector calculated by the command current calculation unit according to the phase difference, and a drive control unit that drives the brushless motor based on the command current vector whose direction is changed by the change unit.

According to the above-described configuration, the direction of the command current vector calculated based on the command torque is changed according to the phase difference. Then, drive of the brushless motor is controlled based on the command current vector after change. By driving the brushless motor based on the command current vector that reflects the phase difference in this way, divergence is unlikely to occur between the d-axis command current, which is a component of the command current vector in the d-axis direction, and the d-axis current, which is a current component in the d-axis direction. Similarly, divergence is unlikely to occur between the q-axis command current, which is a component of the command current vector in the q-axis direction, and the q-axis current, which is a current component in the q-axis direction. As a result, divergence is unlikely to occur between an output torque of the brushless motor and the command torque. Therefore, it is possible to improve controllability of the brushless motor.

DESCRIPTION OF EMBODIMENTS

Hereinafter, an embodiment of a motor control device will be described with reference to FIGS. 1 to 5.

Figure 1:
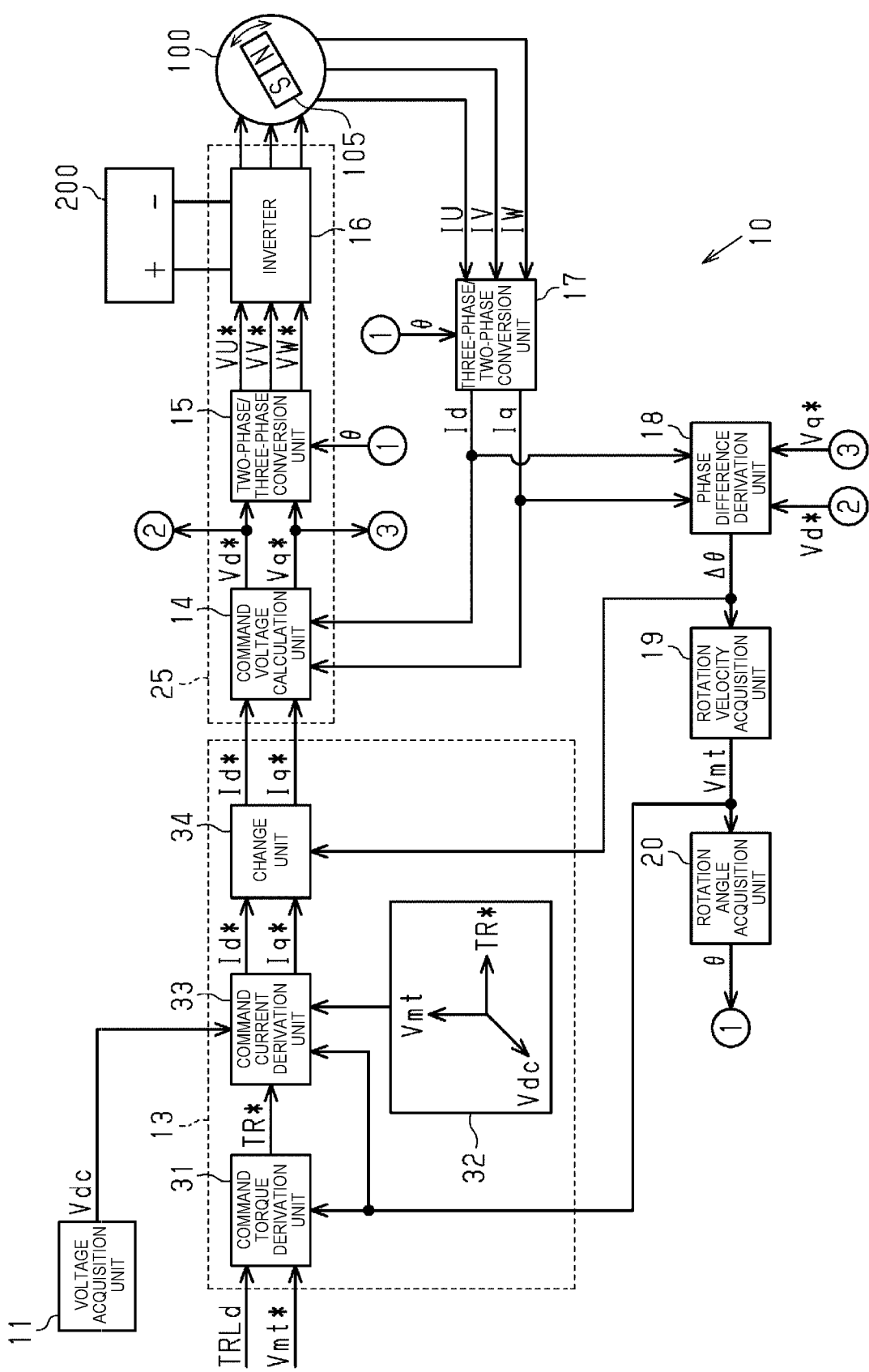
FIG. 1 a schematic configuration diagram illustrating a motor control device of an embodiment and a brushless motor controlled by the motor control device.

FIG. 1 illustrates a motor control device 10 of the present embodiment and a brushless motor 100 controlled by the motor control device 10. The brushless motor 100 is used as a power source for discharging brake fluid in an in-vehicle braking device. The brushless motor 100 is a permanent magnet embedded synchronous motor. The brushless motor 100 includes coils of a plurality of phases (U-phase, V-phase, and W-phase) and a rotor 105 having saliency. Examples of the rotor 105 may include a two-pole rotor in which the north pole and the south pole are magnetized one by one.

The motor control device 10 drives the brushless motor 100 by vector control. Such a motor control device 10 includes a command current determination unit 13, a command voltage calculation unit 14, a two-phase/three-phase conversion unit 15, an inverter 16, a three-phase/two-phase conversion unit 17, a phase difference derivation unit 18, a rotation velocity acquisition unit 19, and a rotation angle acquisition unit 20. In the present embodiment, a drive control unit 25 for driving the brushless motor 100 includes the command voltage calculation unit 14, the two-phase/three-phase conversion unit 15, and the inverter 16 based on a d-axis command current Id* and a q-axis command current Iq* determined by the command current determination unit 13.

Further, the motor control device 10 has a voltage acquisition unit 11 that acquires a power supply voltage Vdc corresponding to a voltage of a battery 200 which is a power source of the brushless motor 100. The power supply voltage Vdc is a voltage that can be applied to the brushless motor 100 through the inverter 16.

Although details are described later, the command current determination unit 13 determines a d-axis command current Id*, which is a command value of a current component in a d-axis direction in rotating coordinates of vector control, and a q-axis command current Iq*, which is a command value of a current component in a q-axis direction in the rotating coordinates. In the present embodiment, since an induced voltage in the brushless motor 100 is suppressed by weak field control, the d-axis command current Id* becomes a negative value. Note that a d-axis and a q-axis are orthogonal to each other in the rotating coordinates.

The command voltage calculation unit 14 calculates a d-axis command voltage Vd* by feedback control based on the d-axis command current Id* and a d-axis current Id. The d-axis current Id is a value indicating a current component of a current vector, which is generated in the rotating coordinates by supplying power to the brushless motor 100, in a direction of an estimated d-axis. Further, the command voltage calculation unit 14 calculates a q-axis command voltage Vq* by feedback control based on the q-axis command current Iq* and a q-axis current Iq. The q-axis current Iq is a value indicating a current component of the current vector, which is generated in the rotating coordinates by supplying power to the brushless motor 100, in a direction of an estimated q-axis.

Note that the estimated d-axis is an axis estimated to be the d-axis of the rotating coordinates. An actual d-axis of the rotating coordinates is referred to as a real d-axis. Further, an actual q-axis of the rotating coordinates is referred to as a real q-axis, and an axis estimated to be the q-axis of the rotating coordinates is referred to as the estimated q-axis.

The two-phase/three-phase conversion unit 15 converts the d-axis command voltage Vd* and the q-axis command voltage Vq* into a U-phase command voltage VU*, a V-phase command voltage VV*, and a W-phase command voltage VW* based on a rotor rotation angle θ which is a rotation angle of the rotor 105. The U-phase command voltage VU* is a command value of a voltage applied to a U-phase coil. The V-phase command voltage VV* is a command value of a voltage applied to a V-phase coil. The W-phase command voltage VW* is a command value of a voltage applied to a W-phase coil.

The inverter 16 includes a plurality of switching elements operated by power supplied from the battery 200. The inverter 16 generates a U-phase signal by the U-phase command voltage VU* input from the two-phase/three-phase conversion unit 15 and ON/OFF operations of the switching elements. Further, the inverter 16 generates a V-phase signal by the input V-phase command voltage VV* and ON/OFF operations of the switching elements. Further, the inverter 16 generates a W-phase signal by the input W-phase command voltage VW* and ON/OFF operations of the switching elements. Then, the U-phase signal is input to the U-phase coil of the brushless motor 100, the V-phase signal is input to the V-phase coil, and the W-phase signal is input to the W-phase coil.

To the three-phase/two-phase conversion unit 17, a U-phase current IU, which is a current flowing through the U-phase coil of the brushless motor 100, is input, a V-phase current IV, which is a current flowing through the V-phase coil thereof, is input, and a W-phase current IW, which is a current flowing through the W-phase coil thereof, is input. Then, the three-phase/two-phase conversion unit 17 converts the U-phase current IU, the V-phase current IV, and the W-phase current IW into the d-axis current Id, which is a current component in the d-axis direction, and the q-axis current Iq, which is a current component in the q-axis direction, based on the rotor rotation angle θ.

The phase difference derivation unit 18 derives a phase difference Δθ between a direction of the real d-axis and a direction of the estimated d-axis. The phase difference Δθ referred to here is a value obtained by subtracting the direction of the real d-axis from the direction of the estimated d-axis. Examples of a method for deriving the phase difference Δθ may include an induced voltage method. In this case, the phase difference derivation unit 18 derives the phase difference Δθ between the direction of the real d-axis and the direction of the estimated d-axis based on the d-axis command voltage Vd*, the q-axis command voltage Vq*, the d-axis current Id, and the q-axis current Iq.

The rotation velocity acquisition unit 19 acquires a rotor rotation velocity Vmt, which is a rotation velocity of the rotor 105. For example, the rotation velocity acquisition unit 19 obtains the rotor rotation velocity Vmt as the rotation velocity of the rotor 105 by proportionally integrating the phase difference Δθ derived by the phase difference derivation unit 18.

The rotation angle acquisition unit 20 acquires a rotor rotation angle θ. For example, the rotation angle acquisition unit 20 obtains the rotor rotation angle θ by integrating the rotor rotation velocity Vmt.

Next, the command current determination unit 13 will be described in detail.

As illustrated in FIG. 1, the command current determination unit 13 includes a command torque derivation unit 31, a map storage unit 32, a command current derivation unit 33, and a change unit 34.

The command torque derivation unit 31 derives a command torque TR*, which is a command value of a torque of the brushless motor 100. That is, the command torque derivation unit 31 derives the command torque TR* based on an estimated value TRLd of a load torque of the brushless motor 100, a command rotation velocity Vmt*, which is a command value of the rotor rotation velocity, and the rotor rotation velocity Vmt acquired by the rotation velocity acquisition unit 19.

Here, for example, a load of the brushless motor 100 tends to increase as the viscosity of the brake fluid circulating in the braking device increases. As a temperature of the brake fluid increases, the viscosity of the brake fluid tends to decrease. For this reason, the estimated value TRLd of the load torque decreases as the temperature of the brake fluid increases.

An example of a process of deriving the command torque TR* will be described. The command torque derivation unit 31 calculates a correction torque TRA by feedback control in which a deviation between the command rotation velocity Vmt* and the rotor rotation velocity Vmt is input. Then, the command torque derivation unit 31 derives a sum of the calculated correction torque TRA and the estimated value TRLd of the load torque as the command torque TR*.

The command current derivation unit 33 derives the d-axis command current Id* and the q-axis command current Iq*, that is, derives a command current vector HC based on the command torque TR* derived by the command torque derivation unit 31, the power supply voltage Vdc acquired by the voltage acquisition unit 11, and the rotor rotation velocity Vmt acquired by the rotation velocity acquisition unit 19. A value indicating a current component of the command current vector HC in the d-axis direction is the d-axis command current Id*, and a value indicating a current component of the command current vector HC in the q-axis direction is the q-axis command current Iq*. In the present embodiment, the command current derivation unit 33 uses a map stored in the map storage unit 32 to derive a value based on the power supply voltage Vdc, the command torque TR*, and the rotor rotation velocity Vmt as the d-axis command current Id* and the q-axis command current Iq*.

The map is a map in which the power supply voltage Vdc, the rotor rotation velocity Vmt, and the command torque TR* are set as axes. For example, the map is a map created in consideration of a voltage limit circle and a current limit circle. For this reason, when the d-axis command current Id* and the q-axis command current Iq* are calculated using the map under the condition that a direction of the estimated d-axis coincides with a direction of the real d-axis, and a direction of the estimated q-axis coincides with a direction of the real q-axis, a point represented by the d-axis command current Id* and the q-axis command current Iq* is included in a region surrounded by the voltage limit circle and the current limit circle in the rotating coordinates.

Here, the current limit circle is a current characteristic on the d-axis and the q-axis determined from an upper limit current Idqlimit, which is an upper limit of a current that can be passed through the switching elements included in the inverter 16. A size of the current limit circle increases as the upper limit current Idqlimit of the switching elements increases.

The voltage limit circle is a current characteristic on the d-axis and the q-axis based on the power supply voltage Vdc and the angular velocity ωe of the rotor 105 of the brushless motor 100. That is, when at least one of the power supply voltage Vdc and the angular velocity ωe changes, a shape of a voltage limit circle CR2 changes.

The change unit 34 changes a direction of the command current vector HC according to the phase difference Δθ derived by the phase difference derivation unit 18 without changing the magnitude of the command current vector HC derived by the command current derivation unit 33. That is, when it can be determined that the direction of the estimated d-axis is retarded with respect to the direction of the real d-axis based on the phase difference Δθ, the change unit 34 changes the direction of the command current vector HC to the advance side. On the other hand, when it can be determined that the direction of the estimated d-axis is advanced with respect to the direction of the real d-axis based on the phase difference Δθ, the change unit 34 changes the direction of the command current vector HC to the retard side. Moreover, the amount of change in the direction of the command current vector HC at this time is equal to the absolute value of the phase difference Δθ. That is, the larger the absolute value of the phase difference Δθ, the larger the amount of change in the direction of the command current vector HC by the change unit 34.

Next, the operation and effect of the present embodiment will be described.

Figure 2:
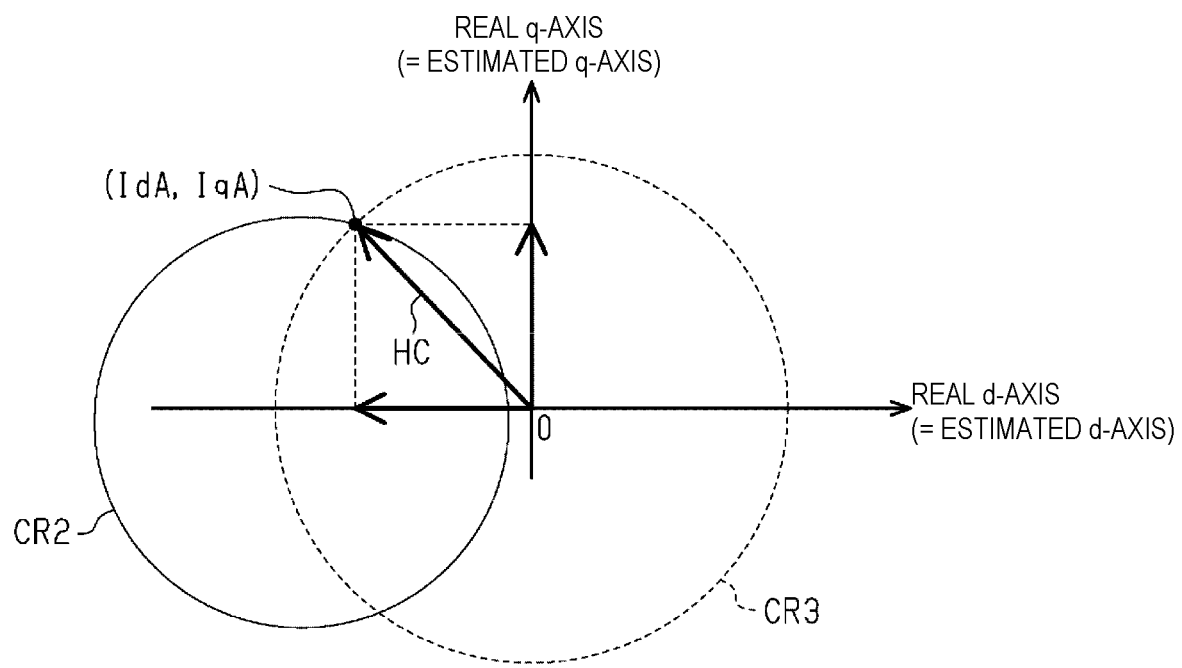
FIG. 2 is a graph for description of a command current vector when a direction of an estimated d-axis coincides with a direction of a real d-axis.
Figure 3:
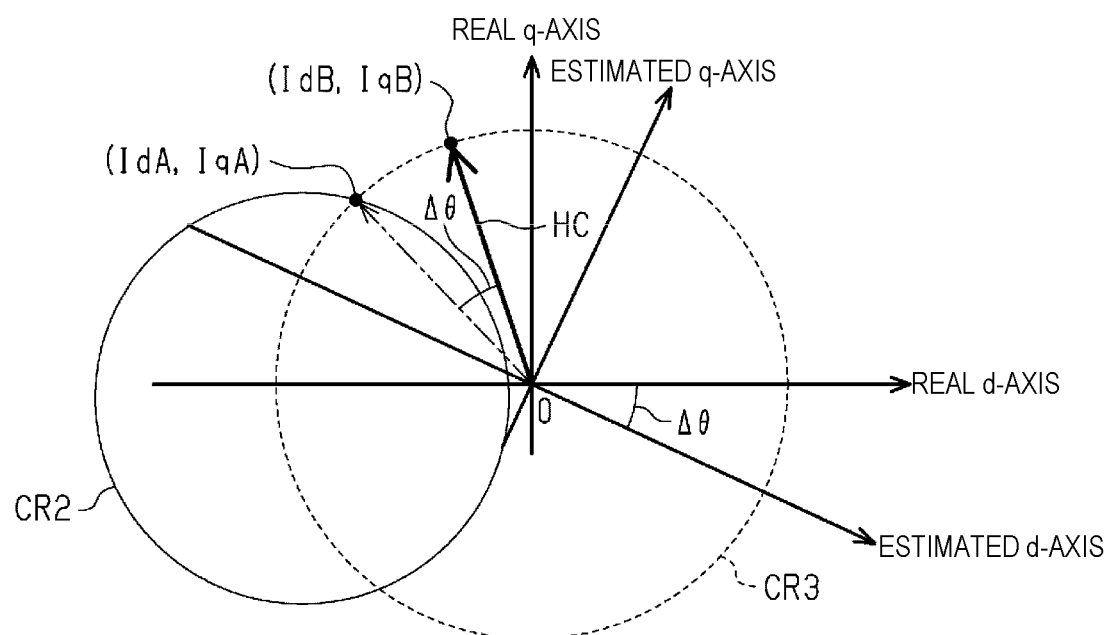
FIG. 3 is a graph for description of the command current vector when the direction of the estimated d-axis diverges from the direction of the real d-axis.
Figure 4:
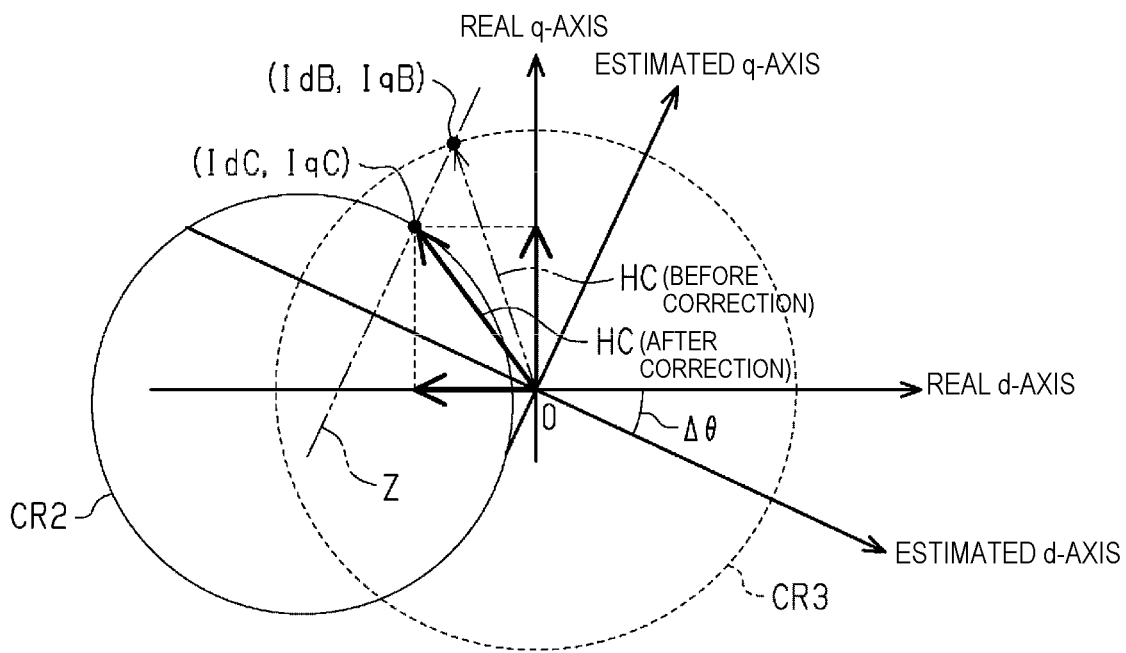
FIG. 4 is a graph for description of a state in which a direction of the command current vector is corrected in a comparative example.

First, a description will be given of a comparative example in which the brushless motor 100 is driven without changing the direction of the command current vector HC based on the phase difference Δθ. Both a current limit circle CR3 and the voltage limit circle CR2 are illustrated in FIGS. 2, 3, and 4. When the rotor 105 of the brushless motor 100 has saliency, an inductance Ld in the d-axis direction is different from an inductance Lq in the q-axis direction, and thus the voltage limit circle CR2 becomes elliptical. However, in FIGS. 2, 3, and 4, the voltage limit circle CR2 is drawn as a perfect circle for convenience of description and understanding.

FIG. 2 illustrates a case where the direction of the real d-axis coincides with the direction of the estimated d-axis, and the phase difference Δθ is "0°". When the d-axis current Id at an intersection of the current limit circle CR3 and the voltage limit circle CR2 is defined as a d-axis current IdA, and the q-axis current Iq at the intersection is defined as a q-axis current IqA, the command current vector HC is derived such that the d-axis command current Id* becomes the d-axis current IdA, and the q-axis command current Iq* becomes the q-axis current IqA in examples illustrated in FIGS. 2 to 4. When the phase difference Δθ is "0°" as illustrated in FIG. 2, a command point which is a point represented by the d-axis command current Id* and the q-axis command current Iq* is included in a region surrounded by the current limit circle CR3 and the voltage limit circle CR2 in the rotating coordinates. For this reason, in the comparative example, the drive of the brushless motor 100 is controlled based on the command current vector HC illustrated in FIG. 2.

In this case, the real d-axis command current actually used for controlling the brushless motor 100 is the d-axis current IdA, which is a value indicating a current component of the command current vector HC in the d-axis direction. Further, the real q-axis command current actually used for controlling the brushless motor 100 is the q-axis current IqA, which is a value indicating a current component of the command current vector HC in the q-axis direction. As a result, divergence is unlikely to occur between the d-axis current Id output from the three-phase/two-phase conversion unit 17 and the d-axis command current Id*(=IdA), and divergence is unlikely to occur between the q-axis current Iq output is from the three-phase/two-phase conversion unit 17 and the q-axis command current Iq*(=IqA). Therefore, the output torque of the brushless motor 100 and the command torque TR* are unlikely to diverge from each other.

FIG. 3 illustrates an example of a case where the direction of the real d-axis diverges from the direction of the estimated d-axis, and the phase difference Δθ is not "0°". In a case where the phase difference Δθ is not "0°", even when the command current vector HC is derived such that the d-axis command current Id* becomes the d-axis current IdA, and the q-axis command current Iq* becomes the q-axis current IqA using the map, the d-axis command current Id* becomes a d-axis current IdB and the q-axis command current Iq* becomes a q-axis current IqB in the actually derived command current vector HC. In the rotating coordinates, a point represented by the d-axis current IdB and the q-axis current IqB is not included in the region surrounded by the current limit circle CR3 and the voltage limit circle CR2. For this reason, in the comparative example, when the phase difference Δθ is not "0°", the command current vector HC is changed so that the point represented by the d-axis command current Id* and the q-axis command current Iq* is included in the region surrounded by the current limit circle CR3 and the voltage limit circle CR2.

Here, a method of changing the command current vector HC in the comparative example will be described with reference to FIG. 3. A straight line Z indicated by an alternate long and short dash line in FIG. 3 is a line parallel to the estimated q-axis and passing through a point represented by the d-axis current IdB and the q-axis current IqB. In the comparative example, the command current vector HC is corrected so as to be a vector toward an intersection of the straight line Z and the voltage limit circle CR2. The command current vector HC after correction is a current vector in which the d-axis current IdC at the intersection of the straight line Z and the voltage limit circle CR2 is the d-axis command current Id*, and the q-axis current IqC at the intersection is the q-axis command current Iq*. When the command current vector HC is corrected in this way, the magnitude of the command current vector HC after correction becomes smaller than the magnitude of the command current vector HC before correction. That is, a sum of the square of the q-axis current IqC and the square of the d-axis current IdC is smaller than a sum of the square of the q-axis current IqB and the square of the d-axis current IdB. For this reason, when the brushless motor 100 is driven based on the command current vector HC after correction, divergence occurs between the output torque of the brushless motor 100 and the command torque TR* by the phase difference Δθ. In the example illustrated in FIG. 3, the output torque of the brushless motor 100 is smaller than the command torque TR* by the amount of the phase difference Δθ.

Next, the present embodiment will be described with reference to FIG. 5. Note that in FIG. 5, for convenience of description and understanding, the voltage limit circle CR2 is drawn as a perfect circle.

Figure 5:
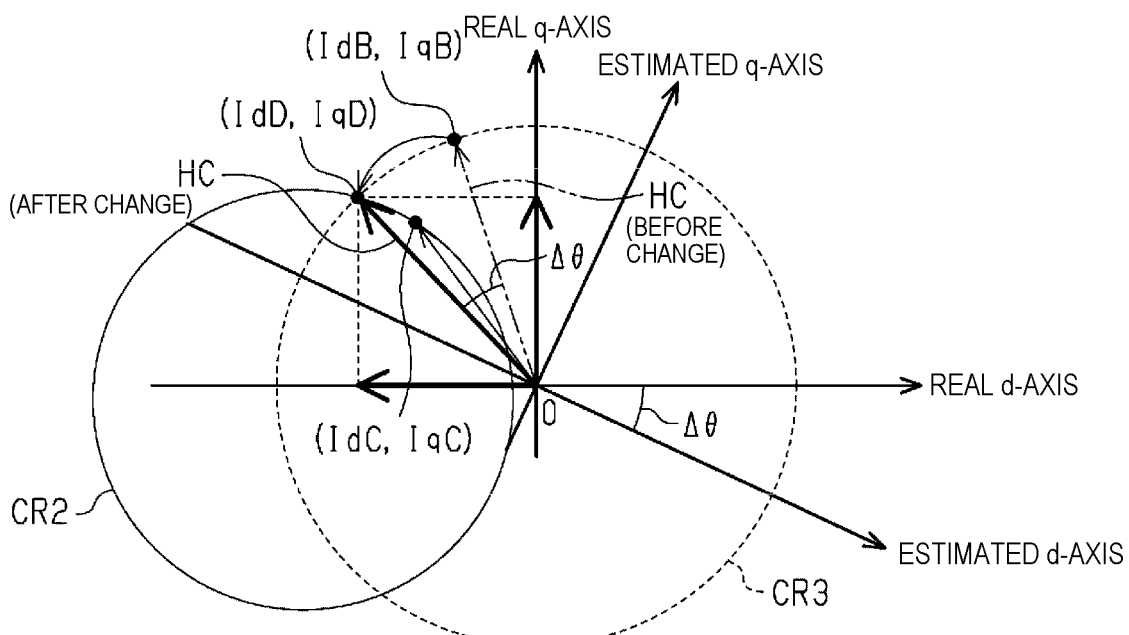
FIG. 5 is a graph for description of a state in which the command current vector is changed according to a phase difference in the embodiment.

On the other hand, as illustrated in FIG. 5, when the direction of the real d-axis diverges from the direction of the estimated d-axis deviate, the direction of the command current vector HC derived by the command current deriving unit 33 is changed by the change unit 34 according to the phase difference Δθ. In the present embodiment, the direction of the command current vector HC is changed by the phase difference Δθ without changing the magnitude of the command current vector HC. In the example illustrated in FIG. 5, a value indicating a current component of the command current vector HC after change in the d-axis direction becomes a d-axis current IdD, and a value indicating a current component of the command current vector HC after change in the q-axis direction becomes a q-axis current IqD. That is, the d-axis command current Id* is changed from the d-axis current IdB to the d-axis current IdD, and the q-axis command current Iq* is changed from the q-axis current IqB to the q-axis current IqD. In this case, a sum of the square of the q-axis current IqD and the square of the d-axis current IdD is the same as a sum of the square of the q-axis current IqB and the square of the d-axis current IdB.

Moreover, as illustrated in FIG. 5, a point represented by the d-axis current IdD and the q-axis current IqD is the intersection of the current limit circle CR3 and the voltage limit circle CR2. That is, the point represented by the d-axis current IdD and the q-axis current IqD is included in the region surrounded by both the current limit circle CR3 and the voltage limit circle CR2. For this reason, the brushless motor 100 is driven based on the d-axis command current Id* and q-axis command current Iq* after change. In this case, divergence is unlikely to occur between the d-axis current Id output from the three-phase/two-phase conversion unit 17 and the d-axis command current Id*(=IdD) after change, and divergence is unlikely to occur between the q-axis current Iq output from the three-phase/two-phase conversion unit 17 and the q-axis command current Iq* (=IqD) after change. As a result, divergence is unlikely to occur between the output torque of the brushless motor 100 and the command torque TR*. Therefore, the controllability of the brushless motor 100 can be improved even in a situation where the phase difference Δθ is not "0°".

Note that in the example illustrated in FIG. 5, since the direction of the estimated d-axis is located on the retard side of the direction of the real d-axis, the command current vector HC is changed to the advance side. An event that the direction of the estimated d-axis is located on the retard side of the direction of the real d-axis is likely to occur when the rotor rotation velocity Vmt increases. That is, in the present embodiment, it is possible to improve controllability of the brushless motor 100 when the rotor rotation velocity Vmt is increasing.

On the other hand, when the rotor rotation velocity Vmt decreases, the direction of the estimated d-axis may be located on the advance side of the direction of the real d-axis. In this case, in the present embodiment, the command current vector HC is changed to the retard side by the amount of the phase difference Δθ. Then, by driving the brushless motor 100 based on the command current vector HC after changing to the retard side, it is possible to improve controllability of the brushless motor 100 when the rotor rotation velocity Vmt is decreasing.

Incidentally, in the command current derivation unit 33 in the present embodiment, the map indicating a relationship among the rotor rotation velocity Vmt, the power supply voltage Vdc, the command torque TR*, the d-axis current Id, and the q-axis current Iq is used to derive the command current vector HC. Then, the direction of the calculated command current vector HC is changed according to the phase difference Δθ, and the brushless motor 100 is controlled based on the command current vector HC after change. The magnitude of the command current vector HC after change is the same as the magnitude of the command current vector HC before change. For this reason, it is possible to suppress the divergence between the output torque of the brushless motor 100 and the command torque TR*.

The embodiment can be modified and implemented as follows. The embodiment and the following modifications can be implemented in combination with each other within a technically consistent range.

The command current derivation unit 33 may derive the d-axis command current Id* and the q-axis command current Iq*, that is, the command current vector HC, without using the map. For example, the d-axis command current Id* and the q-axis command current Iq*, that is, the command current vector HC may be calculated by calculation using a calculation formula in which the power supply voltage Vdc, the command torque TR*, and the rotor rotation velocity Vmt are set as variables.

The command torque derivation unit 31 may derive the command torque TR* without using the estimated value TRLd of the load torque of the brushless motor 100. In this case, a value calculated by feedback control in which the deviation ΔVmt between the command rotation velocity Vmt* and the rotor rotation velocity Vmt is input is used as the command torque TR*.

The amount of change in the direction of the command current vector HC by the change unit 34 may be an amount corresponding to the phase difference Δθ. For example, the direction of the command current vector HC may be changed by a value obtained by multiplying the phase difference Δθ by the gain. In this case, the gain may be a positive value less than "1" (for example, 0.8), or a value greater than "1" and less than "2" (for example, 1.1).

The phase difference derivation unit 18 may derive the phase difference Δθ by a method different from the method described in the embodiment. For example, examples of as a method for calculating the phase difference Δθ may include a method of adding a high-frequency voltage signal to the d-axis command voltage Vd*, and deriving the phase difference Δθ based on a high-frequency component of the d-axis current Id at this time as disclosed in "JP-A-2012-44751".

The motor control device 10 may be configured as one or more processors that operate according to a computer program (software), one or more dedicated hardware circuits such as a dedicated hardware that executes at least a part of various processes (application specific IC: ASIC), or a circuit including a combination thereof. The processor includes a CPU and a memory such as a RAM and a ROM, and the memory stores a program code or a command configured to cause the CPU to execute a process. The memory, that is, a storage medium includes any available medium accessible by a general purpose or dedicated computer.

The rotor 105 of the brushless motor 100 may not have saliency. In this case, the inductance Ld in the d-axis direction is the same as the inductance Lq in the q-axis direction. For this reason, the voltage limit circle CR2 is not an ellipse but a perfect circle.

The rotor 105 applied to the brushless motor 100 may be a 4-pole rotor instead of a 2-pole rotor.

The brushless motor to which the motor control device 10 is applied may be a power source of an actuator different from the in-vehicle braking device.

The invention claimed is:

1. A motor control device for driving a brushless motor based on a command current vector represented by a d-axis command current which is a current command value in a direction of an estimated d-axis which is an axis estimated to be a d-axis of rotating coordinates of vector control, and a q-axis command current which is a current command value in a direction of an estimated q-axis which is an axis estimated to be a q-axis of the rotating coordinates, the motor control device comprising:
    a command current derivation unit that derives the command current vector based on a command torque which is a command value of a torque of the brushless motor;
    a phase difference derivation unit that derives a phase difference between a direction of a real d-axis which is an actual d-axis of the rotating coordinates and the direction of the estimated d-axis;
    a change unit that changes a direction of the command current vector derived by the command current derivation unit according to the phase difference; and
    a drive control unit that drives the brushless motor based on the command current vector whose direction is changed by the change unit.

2. The motor control device according to claim 1, wherein the change unit changes the direction of the command current vector to an advance side when the direction of the estimated d-axis is retarded with respect to the direction of the real d-axis, and changes the direction of the command current vector to a retard side when the direction of the estimated d-axis is advanced with respect to the direction of the real d-axis.

3. The motor control device according to claim 1, further comprising
    a command torque derivation unit that derives the command torque based on a load torque of the brushless motor.

4. The motor control device according to claim 1, further comprising:
    a rotation velocity acquisition unit that acquires a rotation velocity of a rotor of the brushless motor;
    a voltage acquisition unit that acquires a power supply voltage which is voltage of a power supply of the brushless motor; and
    a map storage unit that stores a map indicating a relationship among the rotation velocity of the rotor, the power supply voltage, the command torque, the d-axis command current, and the q-axis command current,
    wherein the command current derivation unit uses the map to derive the command current vector by the d-axis command current and the q-axis command current based on the command torque, the power supply voltage, and the rotation velocity of the rotor.

5. The motor control device according to claim 2, further comprising
    a command torque derivation unit that derives the command torque based on a load torque of the brushless motor.

6. The motor control device according to claim 2, further comprising:
    a rotation velocity acquisition unit that acquires a rotation velocity of a rotor of the brushless motor;
    a voltage acquisition unit that acquires a power supply voltage which is voltage of a power supply of the brushless motor; and
    a map storage unit that stores a map indicating a relationship among the rotation velocity of the rotor, the power supply voltage, the command torque, the d-axis command current, and the q-axis command current,
    wherein the command current derivation unit uses the map to derive the command current vector by the d-axis command current and the q-axis command current based on the command torque, the power supply voltage, and the rotation velocity of the rotor.

7. The motor control device according to claim 3, further comprising:
    a rotation velocity acquisition unit that acquires a rotation velocity of a rotor of the brushless motor;
    a voltage acquisition unit that acquires a power supply voltage which is voltage of a power supply of the brushless motor; and
    a map storage unit that stores a map indicating a relationship among the rotation velocity of the rotor, the power supply voltage, the command torque, the d-axis command current, and the q-axis command current,
    wherein the command current derivation unit uses the map to derive the command current vector by the d-axis command current and the q-axis command current based on the command torque, the power supply voltage, and the rotation velocity of the rotor.

8. The motor control device according to claim 5, further comprising:
    a rotation velocity acquisition unit that acquires a rotation velocity of a rotor of the brushless motor;
    a voltage acquisition unit that acquires a power supply voltage which is voltage of a power supply of the brushless motor; and
    a map storage unit that stores a map indicating a relationship among the rotation velocity of the rotor, the power supply voltage, the command torque, the d-axis command current, and the q-axis command current, wherein the command current derivation unit uses the map to derive the command current vector by the d-axis command current and the q-axis command current based on the command torque, the power supply voltage, and the rotation velocity of the rotor.

\* \* \* \* \*